US006966739B2

(12) United States Patent
Figiel et al.

(10) Patent No.: US 6,966,739 B2
(45) Date of Patent: Nov. 22, 2005

(54) CLAMP FOR COIL HANDLER DEVICE

(75) Inventors: Janusz Figiel, Mundelein, IL (US); Alejandro L. Nocom, Lake Zurich, IL (US)

(73) Assignee: Illinois Tool Works, Inc., Glenview, IL (US)

( * ) Notice: Subject to any disclaimer, the term of this patent is extended or adjusted under 35 U.S.C. 154(b) by 0 days.

(21) Appl. No.: 10/779,262

(22) Filed: Feb. 13, 2004

(65) Prior Publication Data

US 2004/0161324 A1 Aug. 19, 2004

Related U.S. Application Data

(63) Continuation-in-part of application No. 10/315,724, filed on Dec. 10, 2002, now Pat. No. 6,840,731.

(51) Int. Cl.[7] .............................................. B60B 29/00
(52) U.S. Cl. ..................................... 414/426; 294/67.1
(58) Field of Search ............................. 294/67.1, 67.2, 294/67.3, 103.1, 103.2; 414/426, 427, 429, 414/619, 911

(56) References Cited

U.S. PATENT DOCUMENTS 2,803,489 A * 8/1957 Zito et al. ................ 294/103.2
2,817,450 A 12/1957 Ulinski
2,823,948 A 2/1958 Horton
2,925,300 A * 2/1960 Kelley ...................... 294/103.2
2,951,725 A 9/1960 St. Jean
3,044,647 A 7/1962 Hopfeld
3,409,156 A 11/1968 Mills
3,436,116 A 4/1969 Anderson
3,606,442 A * 9/1971 Ghislain .................. 294/103.2
3,680,907 A * 8/1972 Siegwart .................. 294/103.2
3,734,328 A 5/1973 Dalglish
4,029,230 A 6/1977 Bolduc et al.
4,460,210 A 7/1984 Miechur (Continued)

FOREIGN PATENT DOCUMENTS

WO WO 93/09054 5/1993

*Primary Examiner*—Richard Ridley
(74) *Attorney, Agent, or Firm*—Mark W. Croll, Esq.; Donald J. Breh, Esq.; Welsh & Katz, Ltd.

(57) ABSTRACT

A clamp is configured for use with a coil handler device for grasping, lifting and transporting a coil of material, the material coiled in such a manner as to have an outer periphery and an inner periphery. The handler device includes a frame and a lifting assembly. The clamp includes a body, and first and second clamping surfaces for engaging and securing the coil along a radial line at the inner and outer peripheries of the coil. A first clamp leg is elongated in a direction along the radial line. A second clamp leg is fixedly connected to the first clamp leg, transverse to the first clamp leg at a first end. The second clamp leg has a second end operably connected to the lifting assembly for raising and lowering the coil secured by the clamping element. First and second clamp arms are positioned along the first clamp leg for securing the coil at the inner and outer peripheries. The first clamp arm is spaced from the second clamp leg and the second clamp arm is intermediate the first clamp arm and the second clamp leg. The first clamp arm is fixed relative to the body and the second clamp arm is movable relative to the body. A coil handling device having the clamp is also disclosed.

16 Claims, 6 Drawing Sheets

U.S. PATENT DOCUMENTS

| | | | | | |
|---|---|---|---|---|---|
| 4,492,402 | A | * | 1/1985 | Bradley | 294/103.2 |
| 4,515,522 | A | | 5/1985 | Sonerud | |
| 4,531,771 | A | | 7/1985 | Bullock | |
| 4,941,798 | A | | 7/1990 | Meier | |
| 5,642,979 | A | | 7/1997 | Cullen et al. | |
| 6,276,628 | B1 | | 8/2001 | Focke et al. | |
| 6,648,580 | B2 | | 11/2003 | Lofgren | |
| 2002/0054811 | A1 | | 5/2002 | Lofgren | |

* cited by examiner

CLAMP FOR COIL HANDLER DEVICE

CROSS-REFERENCE TO RELATED APPLICATION DATA

This application is a continuation-in-part of U.S. patent application Ser. No. 10/315,724, filed Dec. 10, 2002 now U.S. Pat. No. 6,840,731.

BACKGROUND OF THE INVENTION

This invention pertains to a coil handler device. More particularly, the invention pertains to a clamp for a coil manipulating and transporting device for grasping, lifting and moving coiled materials.

Many materials are supplied in coiled form. For example, strapping material, such as plastic or steel strap is often supplied in coiled form on, for example, a spool or spindle.

In handling coiled strapping material, most strapping machines require that the coils be positioned on a strapping dispenser with the longitudinal axis of the coil in either a horizontal orientation or a vertical orientation. That is, the coil is mounted to the dispenser so that the material feeds from a top or bottom of the coil and so that the coiled material can rotate around a spindle or axis positioned in a horizontal orientation. Alternately, the coil can be mounted so that the material is fed from a side of the coil with the coil axis in a vertical orientation.

Coiled strapping material is often quite heavy and can be bulky, vis-à-vis storage and handling. Many such coils can weigh as much as one hundred pounds or more. As such, it is often difficult to grasp, manipulate and transport the coil to position it in either the horizontal or vertical orientation. Typically, the coil must be manipulated manually to position it on the machine. Moreover, when the coils are stacked on one another this difficulty in grasping and manipulating the coil is exacerbated.

Coil grasping and manipulating devices are known; however, these devices are large, motorized equipment items akin to a vehicle. Moreover, because of the overall sizes of such devices, their respective costs are likewise high, thus limiting the ability of the "small" volume user to justify purchase and use of such a handling device.

Accordingly, there exists a need for a coil handler that permits grasping, manipulating and transporting coiled material. Desirably, such a device is configured so that it can "straddle" a coil or stack of coils, grasp a coils and remove it from the coil stack. More desirably, such a handler grasps the coil at a plurality of radially spaced locations, but can hold the coil securely with only one location grasped and secured. Most desirably, such a device can be used to grasp a coil with the coil axis in either a horizontal orientation or a vertical orientation, transport the coil and load the coil onto a machine in the orientation for use.

BRIEF SUMMARY OF THE INVENTION

A coil handler device is configured to grasp, lift and transport a coil of material that is coiled in such a manner as to have an outer periphery and an inner periphery and to define a longitudinal axis.

The handler includes a frame and a grasping and lifting assembly. The grasping and lifting assembly includes at least one clamping element having first and second clamping surfaces for engaging and securing the coil along a radial line at the inner and outer peripheries of the coil. In a preferred embodiment, the handler includes three clamping elements.

Each clamping element includes a first clamp leg elongated in a direction along the radial line (of the coil) and a second clamp leg fixedly connected to the first clamp leg. The second clamp leg is mounted transverse to the first clamp leg at a first end. The second clamp leg has a second end that is operably connected to a lifting assembly for raising and lowering a coil secured by the clamping element. In a present embodiment, the clamping elements are mounted to a plate that is in turn mounted to a cable forming a part of the lifting assembly. The clamping elements are mounted to the plate equally spaced from one another.

The clamping elements each including first and second clamp arms positioned along the first clamp leg for securing the coil at the inner and outer peripheries. The first clamp arm is spaced from the second clamp leg and the second clamp arm is between the first clamp arm and the second clamp leg.

Preferably, the clamping elements are operably connected to the plate by a link to permit movement of the clamping element relative to the plate. The plate facilitates preventing the clamping elements from tangling with each other.

In a preferred clamping element the second clamp arm is fixed on the first clamp leg and the first clamp arm is moveable toward and away from the second clamp arm to permit positioning the clamping element over the coil and locking the clamping element onto the coil.

The lifting assembly cable is operably connected to the clamping elements for raising and lower the clamping element. The lifting assembly can be a manually operated assembly, e.g., crank operated, or it can be an assisted movement.

The frame includes a carriage for moving the handler device. In a present embodiment, the carriage includes a plurality of wheels mounted thereto for moving the handler with the coils suspended or supported therefrom.

To facilitate positioning the handler over a coil or stack of coils, the frame includes a base having an open end and an open central region and defining a generally U-shaped base. The clamping elements are suspended vertically above and about centrally of the open central region of the base. The frame can be configured having a boom to suspend or position the clamping elements over the open central region.

In an alternate handler, the grasping and lifting assembly includes a hook element having first and second legs, in which the second leg is configured to engage and secure the coil thereto along a longitudinal line at the inner periphery of the coil. The boom is disposed so as to support the hook therefrom vertically above and about centrally of the open central region. In a present embodiment, the hook is suspended from the plate from which the clamping elements have been removed. The hook can include a detent or stop block to more effectively secure the coil on the hook.

An alternate clamp includes a body, and first and second clamping surfaces for engaging and securing the coil along a radial line at the inner and outer peripheries of the coil. A first clamp leg is elongated in a direction along the radial line and a second clamp leg is fixedly connected to the first clamp leg. The second clamp leg is transverse to the first clamp leg at a first end and has a second end operably connected to the lifting assembly for raising and lowering the coil.

First and second clamp arms are positioned along the first clamp leg for securing the coil at the inner and outer peripheries. The first clamp arm is spaced from the second clamp leg and the second clamp arm is intermediate the first clamp arm and the second clamp leg. The first clamp arm is fixed relative to the body and the second clamp arm is movable relative to the body.

In a preferred embodiment of the alternate clamp, a ratcheting assembly operably connects to the second clamp arm for moving the arm toward and away from the first clamp arm. The ratcheting assembly includes a rack gear and a pinion gear operably connected to the rack gear.

A plurality of pawls are operably mounted to the clamp body and are engageable with the pinion gear to secure the pinion gear to secure the clamp in a desired closed position. A present clamp includes three pawls, each of the pawls having a pawl leg. The leg of each pawl has a length that is different from the lengths of the other pawl legs. This arrangement provides a greater number of intermediate or incremental steps at which the clamp can be locked onto the coil.

A handle having a pivot is operably connected to the pinion gear. Pivoting the handle in a first direction engages the handle to rotate the pinion gear and when pivoting the handle in a second, opposite direction the pinion gear is not engaged, i.e., rotated.

A locking pin is mounted to the handle for engaging the handle and pinion gear when the handle is rotated in the first direction and for disengaging the handle from the pinion gear when the handle is rotated in the second direction. Rotation of the handle fully toward the pawls releases the pawls from the pinion gear.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
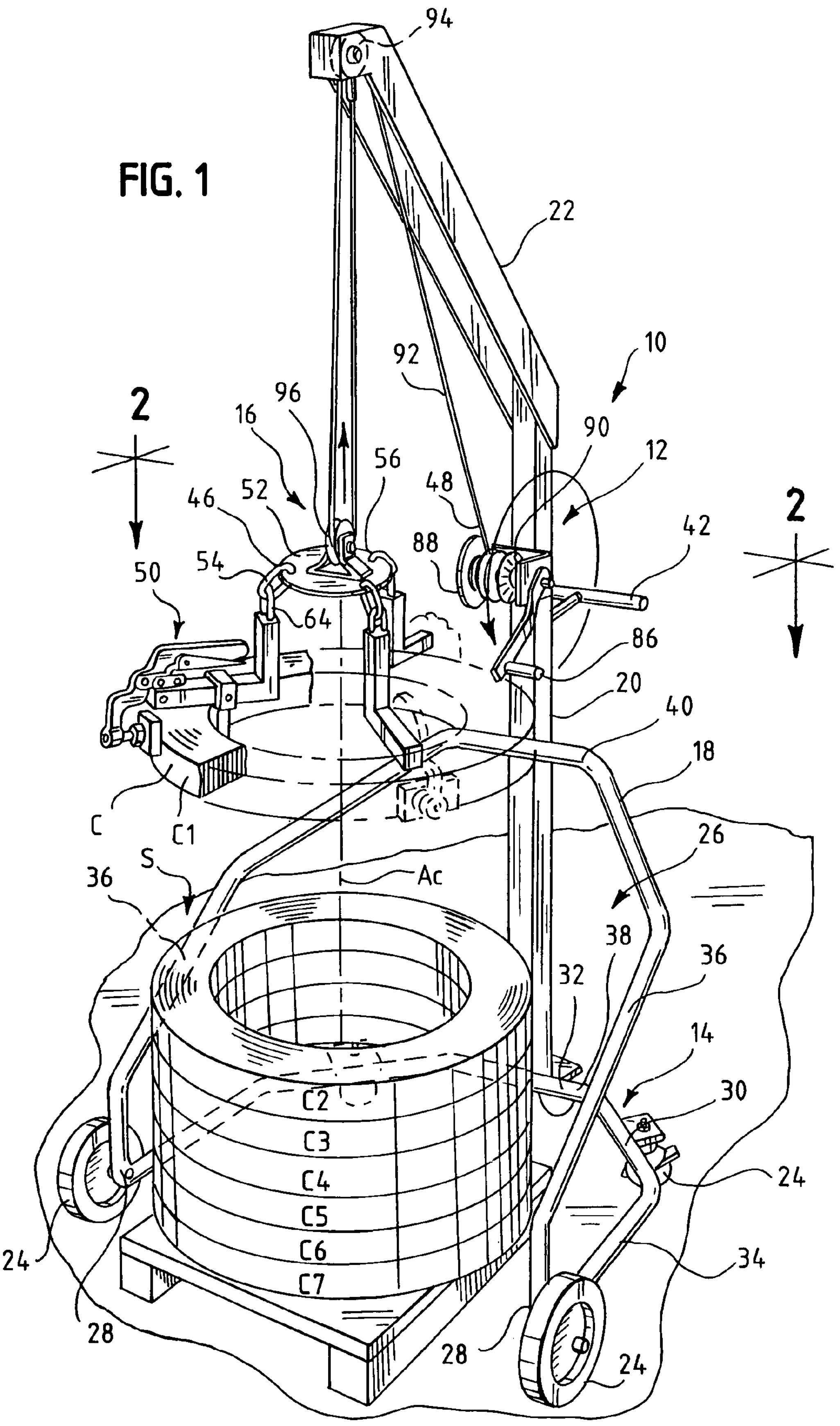
FIG. 1 is a perspective view of one embodiment of a coil handler in accordance with the principles of the present invention, the handler being illustrated with a coil being grasped and lifted from a stack of coils.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated. It should be further understood that the title of this section of this specification, namely, "Detailed Description Of The Invention", relates to a requirement of the United States Patent Office, and does not imply, nor should be inferred to limit the subject matter disclosed herein.

Figure 4:
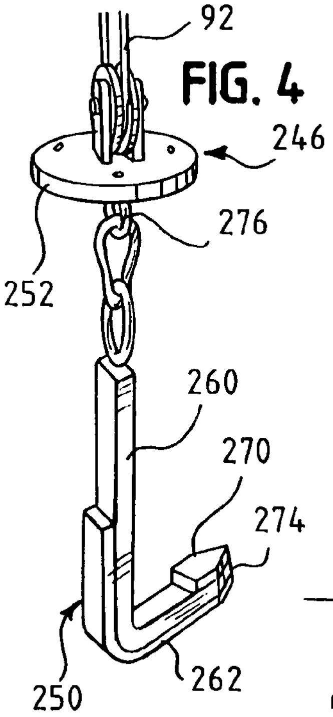
FIG. 4 is an alternate grasping assembly in accordance with the present invention.

Referring now to the figures and in particular to FIG. 1, there is shown a coil handler 10 embodying the principles of the present invention. The handler 10 includes, generally, a frame 12 having a carriage 14, and a grasping assembly and lifting assembly 16. The present handler 10 permits grasping, manipulating and transporting coiled material C. The coils $C_1$–$C_7$, as shown in FIG. 1, can be positioned with the coil axis $A_C$ in a vertical orientation. Alternately, as will be discussed in more detail below, the handler can be configured to grasp, manipulate and transport a coil $C_8$ having its axis $A_{C8}$ in a horizontal orientation (FIG. 4).

As will be recognized by those skilled in the art, materials are generally coiled in a mill wound or a ribbon wound manner. In the mill wind, the material is coiled onto itself or onto a spool in a random manner, without a subsequent wind necessarily overlying a previous wind. In the ribbon wind, the material is positioned to fully overlap or overly a previous layer so that the coil has the same width as the material. The present handler is configured to grasp, manipulate and transport coiled material in either the mill wound or ribbon wound condition.

The frame 12 includes the carriage 14, a mid-support portion 18, a vertical upright 20 and an angled boom 22. Preferably, the carriage 14 includes a plurality of wheels or casters 24 to permit moving the handler 10 without the use of any other transport means, e.g., a wheeled dolly or truck. In a present handler 10, the carriage 14 is formed from tubular material (e.g., steel) having an overall squared-ended U-shape as indicated generally at 26. The wheels 24 are mounted to the carriage 14 at the upper-most ends 28 of the U-legs, at the squared off corners at the juncture of the legs and the base 30, and centrally along the base 32. In the present embodiment, the carriage 14 shape, with the open "top" 34 of the U-shape 26 permits readily positioning the handler 10 over the stack S of coils $C_1$–$C_7$. The number and position of the wheels 24 can, of course, be varied, as can the shape of the carriage 12, to provide a wide variety of carriage shapes and wheel configurations to permit use in essentially any facility environment.

The mid-support 18 can be formed as an integral structure with the carriage 14 and extends upwardly from about the top of the U-legs 28, and rearwardly, essentially following the same shape as the carriage 14. In this manner, the carriage 14 and mid-support 18 structural members are essentially vertically aligned with one another (i.e., the carriage legs 34 and mid-support legs 36 are aligned with each other as are the carriage base 38 and mid-support base 40) to facilitate positioning the handler 10 over the coil stack S.

The vertical upright 20 extends upwardly from about the center of the carriage base 38. In that the carriage base 38 and mid-support base 40 are aligned with one another, the vertical upright 20, in its upward extension also extends adjacent the mid-support base 40. The vertical upright 20 is secured to the carriage and mid-support bases 38, 40 by, for example, welding or other metal-to-metal joining methods. The vertical upright 20 extends upwardly a distance beyond the mid-support base 40 to a juncture with the boom 22.

Figure 2:
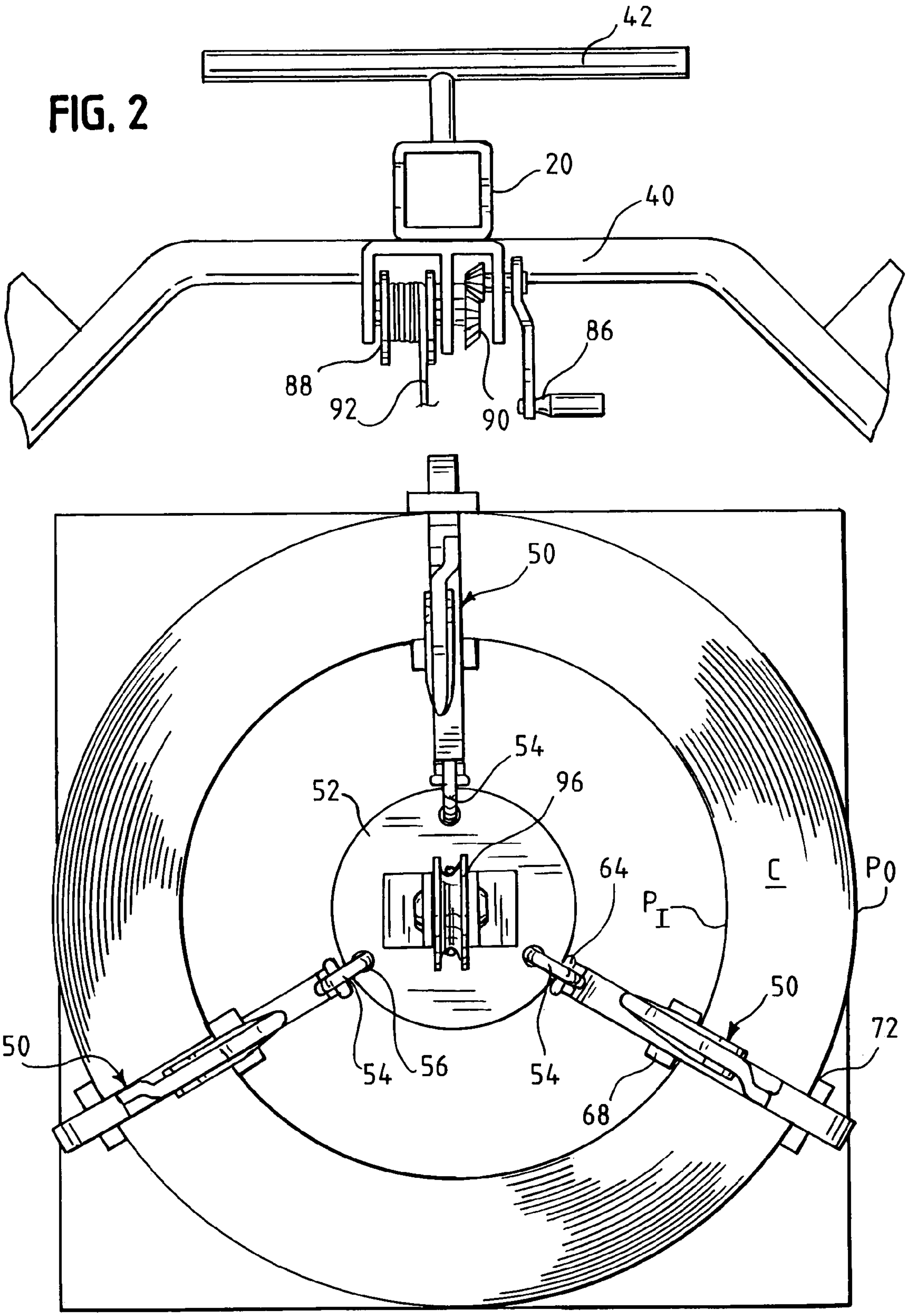
FIG. 2 is a cross-sectional view taken along line 2—2 of FIG. 1 showing the lifting assembly and a portion of the handler frame, and showing the position of the clamping elements as they are engaged with the coil.

The boom 22 extends upwardly and inwardly relative to the vertical upright 20. In a present embodiment, the boom 22 extends inwardly to a point about centrally positioned above the carriage 14 and mid-support 18, within the U-shaped structures. In a current embodiment, the boom 22 is affixed or connected to the vertical upright 20 in a fixed manner, e.g., by welding. However, it is contemplated that the boom 22 can be mounted to the upright 20 by a securable joint so that the boom 22 can be folded down to, for example, store the handler when it is not in use. As seen in FIGS. 1 and 2, a handle 42 extends rearwardly from the upright 20 to facilitate moving the handler 10.

Figure 3:
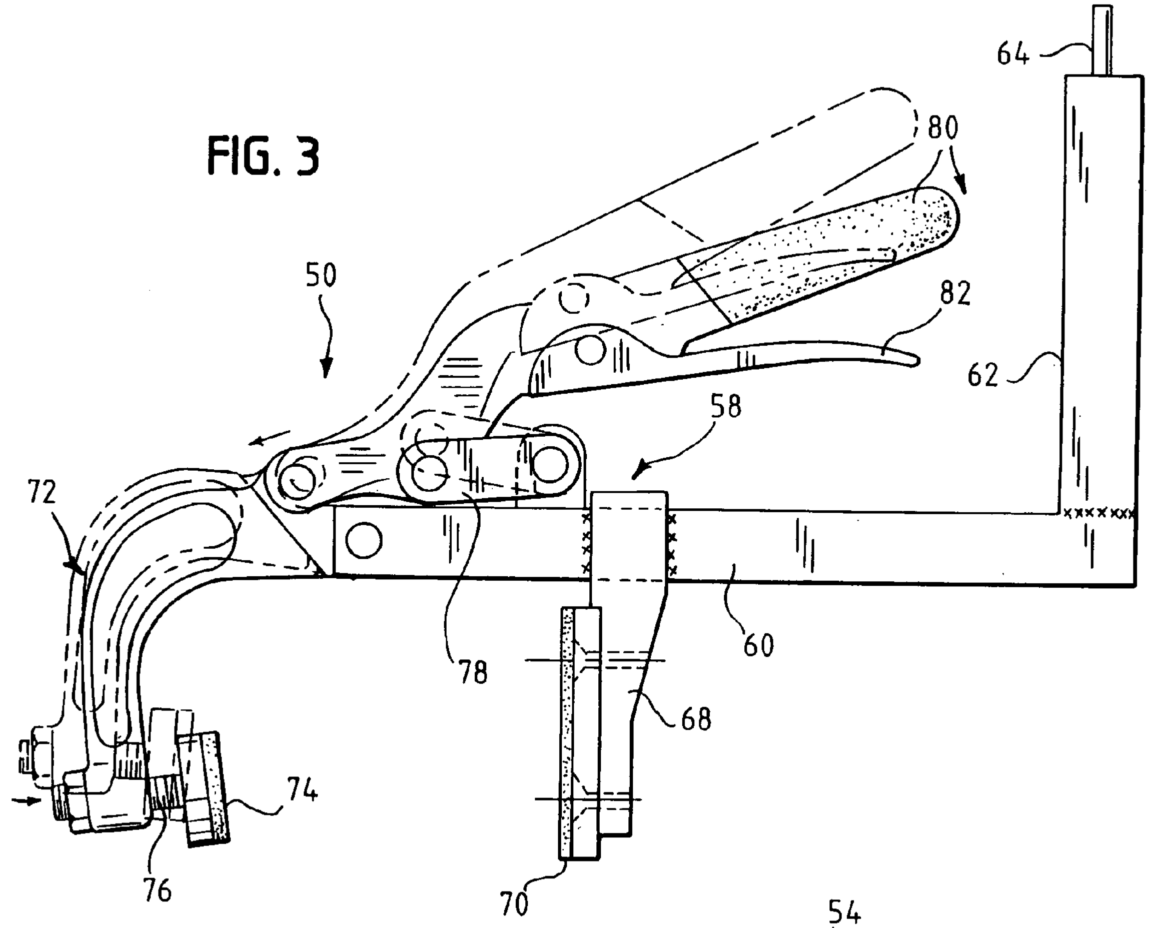
FIG. 3 is a side view of a clamping element, the element being showing in the clamping or engaged condition in solid lines and in the disengaged condition in phantom lines.

The grasping and lifting assembly 16 includes a grasping assembly 46 and a lifting assembly 48. Referring to FIGS. 2 and 3, the grasping assembly 46 includes a plurality of angled toggle clamps or clamping elements 50 that operate or function independent of each other. In one embodiment, each clamp 50 is mounted to a central spacing element or plate 52 by a link 54.

In a present embodiment, the grasping assembly 46 includes three equally circumferentially spaced (i.e., 120 degrees spaced) clamps 50. The links 54 are positioned through openings 56 near the periphery of the plate 52 for securing the clamps 50 to the plate 52.

The clamps 50 include a toggle clamp body 58 having a first clamp leg 60 that is elongated in the direction of force $F_C$ that is applied to the coil C. A second, transverse leg 62 is connected to the elongated leg 60 and includes a free-connecting member 64 for engaging the link 54 to connect to the plate 52. In this manner, as will be discussed below, the locus of engagement of the clamp 50 with the coil C is spaced, both in the direction of force $F_C$, as well as transverse to the direction of force $F_X$, that is applied by the clamp 50 to secure the clamp 50 to the coil C.

As will be recognized by those skilled in the art, the clamp 50 includes a fixed arm 68 having a resilient clamping pad 70 and movable arm 72 also having a resilient clamping pad 74. The movable arm 72 is movable (to move the pad 74) between a first or open position (shown in dotted or phantom lines in FIG. 3) in which the clamp 50 is readily positioned on the coil C and a second or closed position (shown in solid lines in FIG. 3), in which the arm 72 engages the coil C. An adjusting element 76, such as the exemplary adjusting bolt, can be positioned on the clamp 50 to provide a desired grasp (i.e., compression) on the coil C to secure the coil C in the clamp 50. In a current embodiment, the adjusting bolt 76 is positioned on the movable arm 72 to provide adjustable movement of the pad 74. The clamp 50 includes camming links 78 that pivotally connect a handle 80 with the movable arm 72 to move or actuate the movable arm 72 to engage the movable arm pad 74 with the coil C. A release lever 82 permits readily releasing the clamp 50 (i.e., moving the clamp 50 to the open position) to disengage the coil C.

Referring again to FIGS. 1 and 2, the lifting assembly 48 includes a hand-operated crank 86 that is connected to a take-up spool 88 by a gear assembly 90, a cable 92, a pulley or roller 94 located at the upper end of the boom 22, and a pulley or roller 96 mounted to the plate 52. By operating, e.g., rotating the crank 86, the plate 52 (and thus the coil C, if attached), can be raised or lowered as desired. A lock (not shown) can be positioned on the lifting assembly 48 to prevent inadvertently "dropping" the coil C if the crank 86 is let go. Other gearing and roller/pulley configurations can be used to provide a desired "effort" that is required to operate the manual system, which other gearing and pulley configurations are within the scope and spirit of the present invention. Moreover, although a manual crank 86 assembly is illustrated, it is anticipated that an assisted, e.g., motorized, electrically operated or the like, actuator can also be used for raising and lowering the coil C. All such operators, whether manual or assisted are also within the scope and spirit of the present invention.

In use, the handler 10 is positioned over the coil C or coil stack S. The grasping assembly 46 is lowered onto the coil C, or the top coil $C_1$ of a stack S of coils. The clamps 50 are positioned on the coil C with one of the arm pads 70 on an inner periphery $P_I$ of the coil C and the other arm pad 74 positioned radially opposingly, on an outer periphery $P_O$ of the coil C. As set forth above, the clamps 50 are positioned equally circumferentially spaced from one another, so with a grasping assembly having three clamps 50, the clamps 50 are positioned 120 degrees spaced from one another. The clamp handles 80 are urged toward their respective first legs 60 to close and secure the clamps onto the coil C.

Once the clamps 50 are positioned around the coil C and secured to the coil C, the coil C can be lifted using the lifting assembly 48. When the coil C is raised to a desired level or height, the lifting assembly 48 is locked (to prevent the coil C from inadvertently "falling") and the handler 10 can be moved to position the coil C at a desired location to, for example, load the coil C onto a strapping machine (not shown).

Advantageously, it has been found that even though the present handler 10 is configured with a plurality of clamping elements 50 (three as shown), the handler 10 will support a coil C of material in a generally vertical (axis $A_C$) orientation, even with only a single clamping element 50 securing the coil C. That is, even if only a single clamp 50 is locked onto the coil C, the coil C will remain secured by the clamp 50 and will remain in a substantially vertical (axis $A_C$) orientation, that is, the coil C will remain in substantially the orientation as illustrated in FIG. 1.

Particular, exemplary design considerations that enhance the ability of the handler 10 to secure the coil C with a single clamp 50 and maintain the coil axis $A_C$ substantially vertical are the position of the clamp 50 and clamp pads 70, 74 relative to the inner and outer peripheral surfaces $P_I$, $P_O$ of the coil C, the transverse clamp leg 62 and the freely moving connection of the clamp 50 to the plate 52.

Figure 3A:
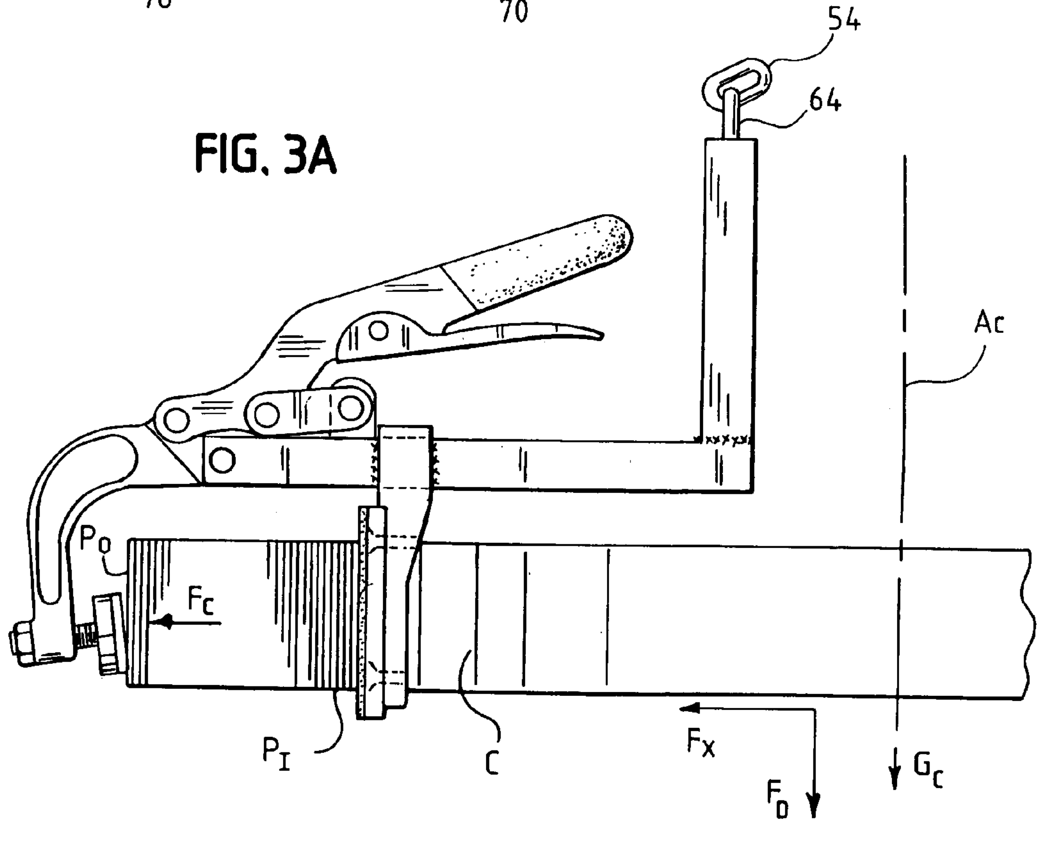
FIG. 3A is a force diagram of the clamping element engaged with a section of the coil, showing the various forces, including the force exerted by the clamp and the force exerted on the clamping element by the weight of the coil.

As to the clamp 50 configuration, referring to FIG. 3A, it can be seen that the force $F_D$ applied to the bulk of the coil C is radially into the coil C. As the weight of the coil C "pulls" the coil C down (from about the center of gravity $G_C$ of the coil C), a portion of that downward force is translated into compressive force $F_C$ to urge the coil C against the pad 74, vis-a-vis the position of the pad 74 as it engages the coil C; rather than a downward force that urges or pulls the coil C out of the clamp 50. Essentially, even with only a single clamp 50 holding the coil C, the forces are such that a portion of the force of gravity (exerted at the center of gravity $G_C$) is translated into a force $F_C$ that urges against the pad 74 and secures the coil C in the clamp 50.

With respect to the transverse clamp leg 62 and the freely moving connection 64/54, because the coil C will tend to come to rest with its center of gravity $G_C$ vertically below the first free connection 64 (e.g., the connection between the clamp 50 and the plate 52), the coil C will tend to "balance", that is come to rest at some orientation close to the vertical (axis $A_C$) orientation, rather than to shift so that the coil C rests at a horizontal (axis) orientation. The rigid nature of the connection between the elongated first leg 60 and the transverse leg 62 thus shifts the point or orientation at which the coil C will come to rest. The movable nature of the link 54 connecting the clamp 50 and the plate 52, however, provides the desired flexibility or maneuverability of the clamp 50 relative to the coil C so as to permit readily securing the clamp 50 to the coil C.

Figure 6:
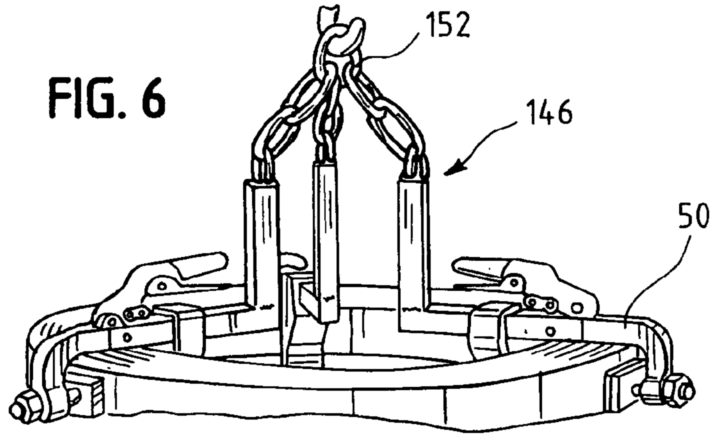
FIG. 6 is an alternate embodiment of the coil handler grasping assembly illustrated in FIGS. 1–3.
Figure 7:
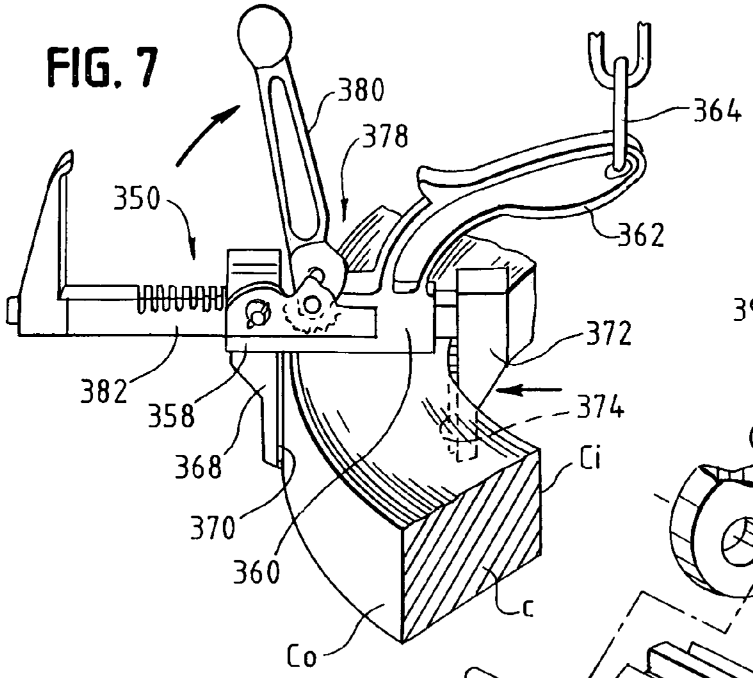
FIG. 7 is a perspective view of an alternate clamping element embodying the principles of the present invention.
Figure 9:
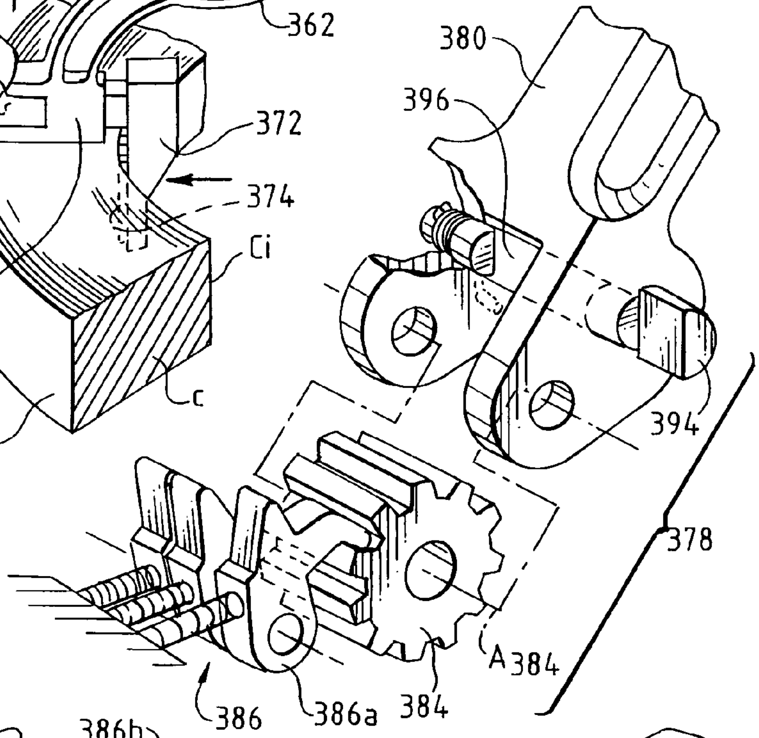
FIG. 9 is an enlarged view of the pawls illustrating a longest of the pawls engaging the pinion gear of the clamp.
Figure 8:
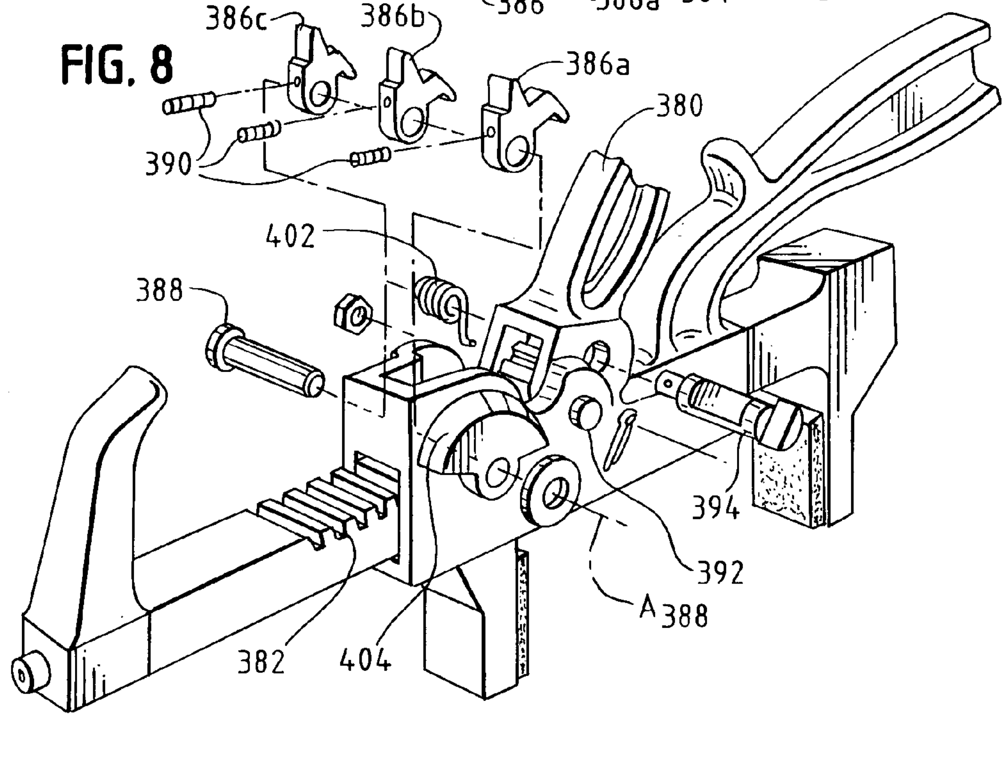
FIG. 8 is an exploded view of the clamp showing the pawl elements.
Figure 10:
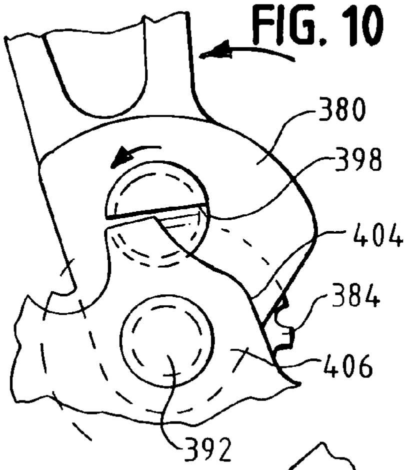
FIG. 10 illustrates the movement or action of the handle in the free-wheeling direction with the pinion gear held by the pawls.
Figure 10A:
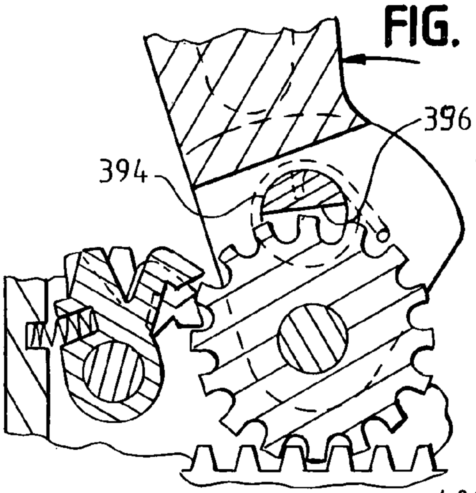
FIG. 10A is a view similar to FIG. 10 shown with a portion of the clamp side wall removed for illustration of the interaction of the pawls and pinion gear.
Figure 10B:
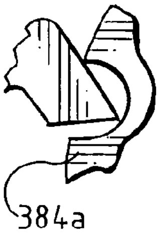
FIG. 10B shows the pawl engaged with a tooth on the pinion gear.

An alternate embodiment of the grasping assembly 146 is illustrated in FIG. 6. In this embodiment, the clamps 50, rather than connecting to a plate 52, are hung from a common link 152 that is secured to the lifting assembly cable 92. The clamping elements 50 are, however, the same as those elements of the embodiment of FIGS. 1 and 2. In this embodiment the coil C will, similar to the first embodiment, tend to "balance" with the coil C resting substantially vertically (that is the axis $A_C$ resting vertically), rather than shift so that the coil C comes to rest horizontally.

Figure 5:
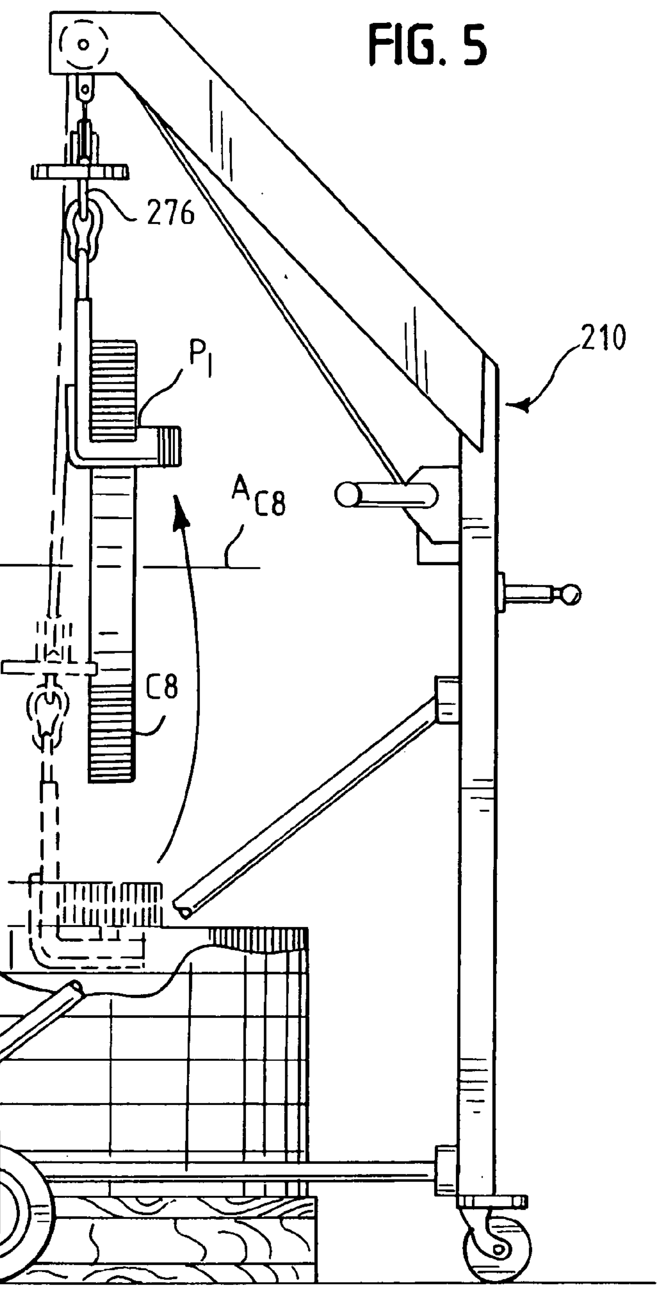
FIG. 5 is a side view of the handler having the grasping assembly of FIG. 5 with a coil loaded onto the assembly.

Still another enhancement to the handler 210 is illustrated in FIGS. 4–5. In this embodiment, the handler 210 includes a grasping assembly 246 that permits grasping and lifting coils $C_8$ that are oriented vertically, and reorienting the coils so that they are horizontally oriented. Such an orientation may be required for example, to load coils $C_8$ onto certain strapping machines.

This embodiment of the grasping assembly 246 includes a hook element 250 that is freely connected to the plate 252. The hook 250 includes a depending leg 260 and a transverse leg 262 extending from the depending leg 260. The transverse leg 262 can include a step or stop block 270 to more positively engage and hold the coil C on the leg 262. A head portion 274 of the transverse leg 262 can be tapered to permit more readily engaging the head 274 with the edge of the coil inner periphery $P_I$.

In a present embodiment, the hook 250 is connected to a closed link or eye portion 276 that is fastened to an underside of the plate 252. In this manner, the same grasping assembly plate 252 and cable 92 connection 96 can be used for either the clamping elements 50 or the hook element 250.

Still another embodiment of the clamp 350 is illustrated in FIGS. 7–13. This embodiment of the clamp is a ratcheting type clamp that can accommodate coils C having a larger range of thicknesses (the thickness as the dimension across the inner and outer periphery of the coil). The clamp 350 includes a clamp body 358 that forms a first clamp leg 360. The first clamp leg 360 extends in generally the radial direction between the inner and outer peripheries of the coil, $C_I$, $C_O$, respectively A second clamp leg 362 is fixedly mounted to the body 358 at the first clamp leg 360. The second leg 362, which is generally transverse to the first clamp leg 360, includes a free connecting member 364, such as a link, to connect the clamp 350 to the lifting assembly.

A first, fixed clamp arm 368 depends from the clamp body 358 and includes a resilient clamp surface or pad 370. A second, movable arm 372 is mounted to the clamp body 358 (for movement relative to the body) and includes a resilient clamp surface or pad 374. When mounted to a coil C, the movable clamp arm 372 is positioned between the fixed clamp arm 368 and the second clamp leg 362.

The movable clamp arm 372 is mounted to the body 358 by a ratcheting assembly indicated generally at 378. The ratching assembly 378 includes a rack gear 382 (to which the movable arm 372 is mounted), and a pinion gear 384 in meshing engagement with the rack gear 382. Movement of the rack gear 382 opens and closes the clamp 350. An actuator or handle 380 is mounted to the body 358 and a plurality of retaining elements or pawls 386 are mounted to (and within) the body 358. The pawls 386 are mounted to the body 358 by a common pivot pin 388 thus defining a common pivot axis $A_{388}$. The pawls 386 are biased toward the pinion gear 384 by springs 390, to engage the pinion gear 384. The pawls 386 are configured to permit one-way rotation of the pinion gear 384 (in the direction indicated by the arrow at 391), and to prevent or lock out the pinion gear 384 from rotation in the opposite direction.

The handle 380 is mounted for pivoting about the pinion gear axis $A_{384}$ and shares a shaft 392 with the pinion gear 384. The handle 380 locks to the gear 384 for movement in the clamping direction and is free to rotate (e.g., free-wheel) in an opposing direction. The locking function is provided by a lock pin 394 that is mounted to the handle 380. The pin 394 extends parallel to the pinion gear 384 and includes a notched shaft 396. The notch 396 defines a shoulder 398 that extends longitudinally along the shaft 396. When the handle 380 is rotated into the engaged position (to engage the pinion gear 384 to close the clamp 350), the shoulder 398 engages one of the gear teeth, e.g., 384*a*, to rotate the gear 384. This, in turn moves the rack gear 382 to close the clamp 350.

Figure 11:
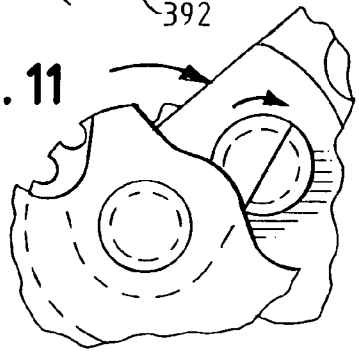
FIG. 11 illustrates the movement or action of the handle to close the clamp with the pinion gear passing over the pawls.
Figure 11A:
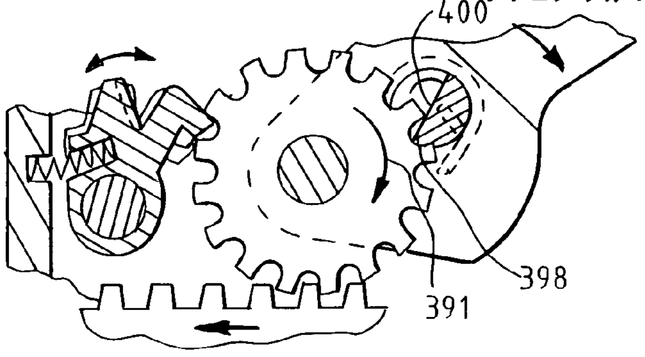
FIG. 11A is a view similar to FIG. 11 shown with a portion of the clamp side wall removed for illustration of the interaction of the pawls and pinion gear and further shown the pinion gear lock on the handle engaging the pinion gear.

As seen in FIG. 11A when the handle 380 is rotated to engage the pinion gear 384, the pinion gear 384 "skips" over the pawls 386 (thus the pawls 386 permit rotation in this closing direction). When the handle 380 is rotated back (as to re-grip the pinion gear 384), the flat surface 400 of the pin notch 396 "skips" over the pinion gear 384 teeth, thus permitting the handle 380 to rotate, but the pawls 386 engage the pinion gear 384 teeth thus holding or retaining the pinion gear 384 in place. This permits closing the clamp 350 and, if need be (if, for example, the clamp 350 is not sufficiently closed), reversing the handle 380 to continue (moving the rack gear 382) to close the clamp 350. The pin 394 is retained in the locking position (that is locked to engage the pinion gear 384) by a spring 402, and is retained in the unlocked position (that is "skipping" over the pinion gear 384 teeth) by movement of the pin notch flat surface 400 on a sloped area 404 on the side wall 406 of the body 358.

Figure 12:
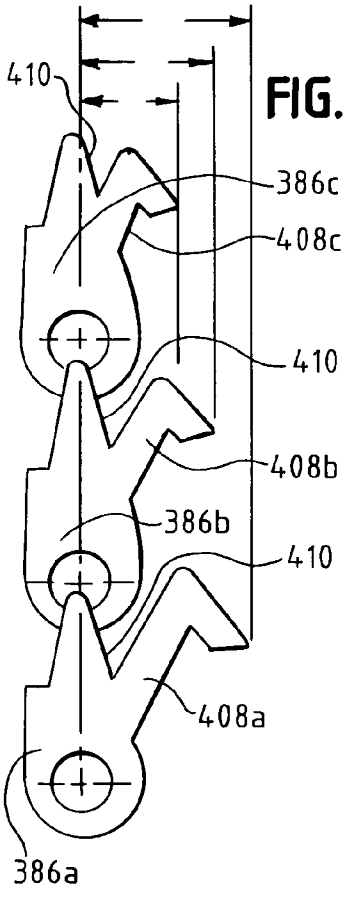
FIG. 12 is a side view of the three different, sequentially sized pawls.
Figure 13:
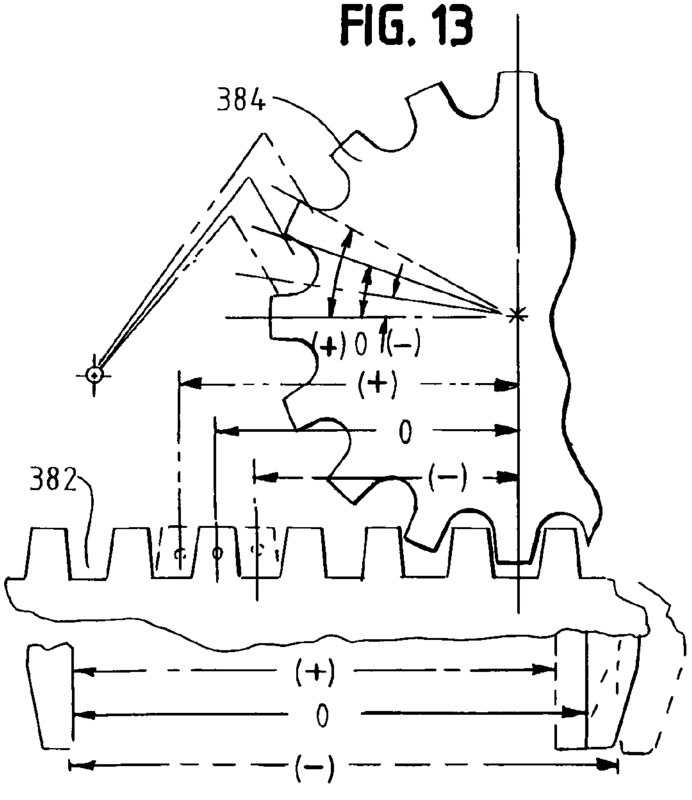
FIG. 13 is a side view of the pinion and rack gears showing the three pawl sizes and their respective engagements with the pinion gear.

The present clamp 350 uses a plurality of pawls 386 to provide a stepped or incremental locking capability. As seen in FIG. 12, three pawls 386*a*–*c* having increasing leg 408*a*–*c* lengths are used. The increased number of pawls 386, each having a different leg 408 length than the other pawls 386, provides a greater number of intermediate or incremental steps at which the clamp 350 can be locked onto the coil C. FIG. 13 illustrates the increased precision or adjustability that the three pawl 386*a–c* arrangement provides with respect to the thickness of a coil C being clamped.

To release the clamp 350 from the coil C, the pawls 386 must be released from the pinion gear 384. To release the pawls 386, the handle 380 is rotated fully toward the pawls 386 so that the handle 380 engages the pawl release surfaces 410. Urging the pawls 386 rearward (away from the pinion gear 384) disengages the pawls 386 from the gear 384, thus releasing the rack gear 382 and opening the clamp 350.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A clamp for a coil handler device for grasping, lifting and transporting a coil of material, the material coiled in such a manner as to have an outer periphery and an inner periphery, the coil handler device having a frame and a lifting assembly, the clamp comprising:

a body;

first and second clamping surfaces for engaging and securing the coil along a radial line at the inner and outer peripheries of the coil;

a first clamp leg elongated in a direction along the radial line;

a second clamp leg fixedly connected to the first clamp leg, the second clamp leg being transverse to the first clamp leg at a first end, the second clamp leg having a second end operably connected to the lifting assembly for raising and lowering a coil secured by the clamping element;

first and second clamp arms positioned along the first clamp leg for securing the coil at the inner and outer peripheries, the first clamp arm being spaced from the second clamp leg and the second clamp arm being intermediate the first clamp arm and the second end of the second clamp leg, the first clamp arm being fixed relative to the body and the second clamp arm being movable relative to the body; and a geared ratcheting assembly operably connected to the second clamp arm for moving the second clamp arm toward and away from the first clamp arm.

2. The clamp in accordance with claim 1 wherein the geared ratcheting assembly includes a rack gear and a pinion gear operably connected to the rack gear.

3. The clamp in accordance with claim 2 including a plurality of pawls operably mounted to the clamp body and engageable with the pinion gear to secure the pinion gear to secure the clamp in a desired closed position.

4. The clamp in accordance with claim 3 including three pawls, each of the pawls having a pawl leg, wherein the leg of each pawl has a length that is different from the lengths of the other pawl legs.

5. The clamp in accordance with claim 2 including a handle having a pivot and operably connected to the pinion gear, wherein pivoting the handle in a first direction engages the handle to rotate the pinion gear, and wherein when the handle is pivoted in a second, opposite direction the pinion gear is not rotated.

6. The clamp in accordance with claim 5 wherein rotating the handle in the first direction to rotate the pinion gear closes the clamp.

7. The clamp in accordance with claim 5 including a locking pin mounted to the handle for engaging the handle and pinion gear when the handle is rotated in the first direction and for disengaging the handle from the pinion gear when the handle is rotated in the second direction.

8. The clamp in accordance with claim 3 including a handle, wherein rotation of the handle fully toward the pawls releases the pawls from the pinion gear.

9. A coil handler device for grasping, lifting and transporting a coil of material, the material coiled in such a manner as to have an outer periphery and an inner periphery and defining a longitudinal axis, comprising:

a frame; and a grasping and lifting assembly including at least one clamp, the at least one clamp having a body, first and second clamping surfaces for engaging and securing the coil along a radial line at the inner and outer peripheries of the coil, a first clamp leg elongated in a direction along the radial line, a second clamp leg fixedly connected to the first clamp leg, the second clamp leg being transverse to the first clamp leg at a first end, the second clamp leg having a second end operably connected to the lifting assembly for raising and lowering a coil secured by the clamping element, and first and second clamp arms positioned along the first clamp leg for securing the coil at the inner and outer peripheries, the first clamp arm being spaced from the second clamp leg and the second clamp arm being intermediate the first clamp arm and the second end of the second clamp leg, the first clamp arm being fixed relative to the body and the second clamp arm being movable relative to the body, the clamp including a geared ratcheting assembly operably connected to the second clamp arm for moving the second clamp arm toward and away from the first clamp arm.

10. The coil handler in accordance with claim 9 wherein the geared ratcheting assembly includes a rack gear and a pinion gear operably connected to the rack gear.

11. The coil handler in accordance with claim 10 including a plurality of pawls operably mounted to the clamp body and engageable with the pinion gear to secure the pinion gear to secure the clamp in a desired closed position.

12. The coil handler in accordance with claim 11 including three pawls, each of the pawls having a pawl leg, wherein the leg of each pawl has a length that is different from the lengths of the other pawl legs.

13. The coil handler in accordance with claim 10 including a handle having a pivot and operably connected to the pinion gear, wherein pivoting the handle in a first direction engages the handle to rotate the pinion gear, and wherein when the handle is pivoted in a second, opposite direction the pinion gear is not rotated.

14. The coil handler in accordance with claim 13 wherein rotating the handle in the first direction to rotate the pinion gear closes the clamp.

15. The coil handler in accordance with claim 13 including a locking pin mounted to the handle for engaging the handle and pinion gear when the handle is rotated in the first direction and for disengaging the handle from the pinion gear when the handle is rotated in the second direction.

16. The coil handler in accordance with claim 11 including a handle, wherein rotation of the handle fully toward the pawls releases the pawls from the pinion gear.

* * * * *